(12) United States Patent
Choi et al.

(10) Patent No.: US 10,941,306 B2
(45) Date of Patent: Mar. 9, 2021

(54) INK COMPOSITION FOR BLEACHING POLARIZING FILM FOR INKJET PRINTER, AND METHOD FOR PREPARING POLARIZING FILM COMPRISING BLEACHED PATTERN FORMED THEREON

(71) Applicant: LG CHEM, LTD., Seoul (KR)

(72) Inventors: Kook-Hyun Choi, Daejeon (KR); Joon-Hyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 143 days.

(21) Appl. No.: 15/505,828

(22) PCT Filed: Oct. 6, 2015

(86) PCT No.: PCT/KR2015/010571
§ 371 (c)(1),
(2) Date: Feb. 22, 2017

(87) PCT Pub. No.: WO2016/056831
PCT Pub. Date: Apr. 14, 2016

(65) Prior Publication Data
US 2017/0283636 A1    Oct. 5, 2017

(30) Foreign Application Priority Data

| Oct. 7, 2014 | (KR) | 10-2014-0134846 |
| Oct. 27, 2014 | (KR) | 10-2014-0146318 |
| Sep. 25, 2015 | (KR) | 10-2015-0136882 |

(51) Int. Cl.
| C09D 11/30 | (2014.01) |
| C09D 11/38 | (2014.01) |
| G02B 5/30 | (2006.01) |
| C09D 11/106 | (2014.01) |
| C08K 3/20 | (2006.01) |
| C08K 5/103 | (2006.01) |
| C08K 3/22 | (2006.01) |
| G02F 1/1335 | (2006.01) |

(52) U.S. Cl.
CPC ............ *C09D 11/30* (2013.01); *C08K 3/20* (2013.01); *C08K 5/103* (2013.01); *C09D 11/106* (2013.01); *C09D 11/38* (2013.01); *G02B 5/305* (2013.01); *C08K 3/22* (2013.01); *C08K 2003/2206* (2013.01); *G02F 1/133528* (2013.01)

(58) Field of Classification Search
CPC ................... C09D 11/38; B05D 5/06
See application file for complete search history.

(56) References Cited

U.S. PATENT DOCUMENTS

| 4,181,756 A | 1/1980 | Fergason |
| 4,243,994 A * | 1/1981 | Kobayashi ............. C09D 11/30 |
| | | 347/100 |
| 4,396,646 A | 8/1983 | Schuler et al. |
| 5,948,149 A * | 9/1999 | Ito .......................... C09D 11/38 |
| | | 106/31.13 |
| 7,208,592 B2 | 4/2007 | Kawanishi et al. |
| 2010/0080908 A1 * | 4/2010 | Wachi ................... C09D 11/328 |
| | | 427/256 |
| 2012/0106063 A1 | 5/2012 | Mathew et al. |
| 2015/0131035 A1 * | 5/2015 | Chen ..................... G02B 5/305 |
| | | 349/96 |

FOREIGN PATENT DOCUMENTS

| CN | 1439667 A | 9/2003 |
| CN | 103725037 A | 4/2014 |
| JP | 2004250587 A | 9/2004 |
| JP | 2005084517 A | 3/2005 |
| KR | 10-2010-0125558 A | 12/2010 |
| KR | 10-2013-0071367 A | 6/2013 |
| KR | 10-2014-0088579 A | 7/2014 |

* cited by examiner

*Primary Examiner* — Alex A Rolland
(74) *Attorney, Agent, or Firm* — Dentons US LLP

(57) ABSTRACT

This invention relates to an ink composition for bleaching a polarizing film for an inkjet printer, including a strong base, a volatilization inhibitor, a viscosity enhancer and a solvent, wherein the amount of the strong base is 5 to 30 wt % based on the total weight of the composition, and to a method of manufacturing a polarizing film having improved pattern transparency using the same.

7 Claims, No Drawings

INK COMPOSITION FOR BLEACHING POLARIZING FILM FOR INKJET PRINTER, AND METHOD FOR PREPARING POLARIZING FILM COMPRISING BLEACHED PATTERN FORMED THEREON

TECHNICAL FIELD

This application is a National Stage Entry of International Application No. PCT/KR2015/010571, filed on Oct. 6, 2015, and claims the benefit of and priority to Korean Application No. 10-2014-0134846, filed on Oct. 7, 2014, Korean Application No. 10-2014-0146318, filed on Oct. 27, 2014, and Korean Application No. 10-2015-0136882, filed Sep. 25, 2015 all of which are hereby incorporated by reference in their entirety for all purposes as if fully set forth herein.

The present invention relates to an ink composition for bleaching a polarizing film for an inkjet printer and to a method of manufacturing a polarizing film having a bleached pattern formed thereon.

BACKGROUND ART

With the recent astonishing advancement of the information technology (IT) industry, a liquid crystal display (LCD), which is a key part of the IT industry, is being developed as a medium for transferring various pieces of information through the development of the modern industrial society into the high information age.

Typically, a flat panel display device such as an LCD or organic EL includes a polarizing film that is attached to the surface of a substrate to block the reflection of external light from a screen on which an image is realized so that a user is able to clearly view the screen.

A polarizing film serves as a portion of an LCD panel by being attached to both surfaces of the liquid crystal cell of a flat panel display such as an LCD or organic EL. An LCD panel is configured such that a polarizing film is bonded to both surfaces of a liquid crystal cell. Specifically, a polarizing film includes a polarizing plate and protective films attached to both surfaces of the polarizing plate by means of adhesive layers. The protective films, which are disposed on and under the polarizing plate, function to prevent damage to the polarizing plate. The upper protective film (a separate film) is stripped and discarded before attachment of the polarizing film to the liquid crystal cell, whereby the exposed adhesive layer mediates the bonding of the polarizing plate and the liquid crystal cell. The lower protective film (a protective film) is stripped and discarded after attachment of the polarizing film to the liquid crystal cell. Here, the adhesive layer is in a state of being attached to the protective film and is thus stripped along with it. The protective films may be formed of an ester resin such as PET or the like.

The polarizing film may be made of polyvinyl alcohol (PVA) having iodine or a dichroic dye adsorbed thereto.

Among typical polymer films, the PVA film has superior optical performance, such as transparency, polarizing properties, etc., and also very high mechanical properties such as elastic modulus, tensile strength, and tensile elongation, and is thus receiving a large amount of attention as an optical material for a polarizing film. A polarizing film has been conventionally utilized in wristwatches, electronic calculators, automotive instrument panels, small LCD TVs, small LCD laptop computers, etc. Accordingly, there is increasing demand for a polarizing film that has excellent polarizing performance and is useful for large areas for large laptop computers, large color TVs, etc., which are being developed these days.

Meanwhile, a polarizing film for use in a display has very low transparency, and thus, when it is attached to the inner and outer surfaces of a cover glass, a specific portion, such as that corresponding to a camera or a sensor of a display, has to become transparent.

With the goal of solving this problem, there has been a method in which energy is transferred to a local portion using a laser so that iodine molecules contained in the polarizing element of the polarizing film are excited and decomposed, thus losing optical properties to thus make the corresponding portion transparent. However, this method is problematic because a moist heat resistance test is performed to ensure ability to withstand humidity and heat that may be applied during processing, and the film may also revert to its original state after the termination of the moist heat resistance test.

Alternatively, a polarizing film is made optically transparent using the oxidation/reduction of sodium thiosulfate ($Na_2S_2O_3$) and iodine ions ($I^-$). However, this method is disadvantageous in that the transparency of the polarizing element of the bleached polarizing film is insufficient and the film may also revert to its original state after having been allowed to stand at room temperature for a short time.

Furthermore, conventional large or small displays are manufactured using reinforced glass, and thus, glass may be scattered in the absence of an additional protective film when broken.

DISCLOSURE

Technical Problem

Conventional techniques for improving the transparency of a polarizing film are problematic because the transparency of the polarizing element of a polarizing film is insufficient and the film may also revert to its original state within a short time.

Therefore, the present invention is intended to provide an ink composition for bleaching a polarizing film for an inkjet printer, in which the polarizing film is bleached using an inkjet printing process.

In particular, the ink composition of the present invention makes the polarizing element of a polarizing film partially or entirely transparent.

Furthermore, transparency is maintained even after moisture resistance and/or heat resistance tests, and moreover, the ink composition may be efficiently discharged in an inkjet printing process, whereby the polarizing film may be accurately patterned and bleached.

Technical Solution

An aspect of the present invention provides an ink composition for bleaching a polarizing film for an inkjet printer, comprising a strong base, a volatilization inhibitor, a viscosity enhancer and a solvent, wherein the strong base is contained in an amount of 5 to 30 wt % based on the total weight of the composition.

In a preferred embodiment of the present invention, the composition may further comprise at least one selected from the group consisting of a defoamer and a surfactant, and the composition may be suitable for use in bleaching a polarizing film. Also, in a preferred embodiment of the present invention, the polarizing film may be a polyvinyl alcohol (PVA) polarizing film.

Another aspect of the present invention provides a method of manufacturing a polarizing film having a bleached pattern formed thereon, comprising the steps of (1) heating a polarizing film, (2) bleaching the heated polarizing film by discharging the ink composition through the inkjet head of an inkjet printer, and (3) neutralizing the bleached polarizing film, wherein the ink composition is discharged in an amount of 0.02 to 0.5 ml/cm$^2$ per unit area of the heated polarizing film in the step (2).

In a preferred embodiment of the present invention, the step (1) may be performed at a temperature ranging from 30 to 100° C., and the ink composition may include a strong base, a volatilization inhibitor, a viscosity enhancer and a solvent. Also in a preferred embodiment of the present invention, the bleaching in the step (2) may be performed for 3 to 30 sec. Also in a preferred embodiment of the present invention, the step (3) may be performed through a dipping process in a neutralization solution or a coating process with a neutralization solution. Also, the method may further comprise (4) performing a drying process, after the step (3).

Still another aspect of the present invention provides a polarizing film having a bleached pattern formed thereon, manufactured by the above method, and yet another aspect of the present invention provides a display including the polarizing film.

Advantageous Effects

According to the present invention, an ink composition can be applied to an inkjet printing process so that the polarizing element of a polarizing film can be bleached. The ink composition of the present invention can cause a chemical reaction of the polarizing element of the polarizing film, whereby the polarizing element is made optically transparent.

Thus, when the ink composition of the present invention is applied to an inkjet printing process in this way, a specific portion, such as a sensor, a camera, etc. can be patterned, and only the corresponding portion can be made transparent. The polarizing film, manufactured by the method of the present invention, can be utilized for a specific portion that has to be transparent, such as a sensor, a camera, etc.

The ink composition of the present invention has a very short bleaching time, and can be prevented from volatilization and nozzle wetting. Thereby, excellent jetting and jetting stability can result, and the bleached pattern can be maintained even after moisture resistance/heat resistant testing following bleaching.

The present invention proposes an amount of the ink composition per unit area that is suitable for bleaching the polarizing film.

The polarizing film to which the ink composition of the present invention is applied can additionally prevent glass from being scattered in the event that a cover glass breaks, even without an additional protective film.

BEST MODE

Hereinafter, a detailed description will be given of the present invention. The following description is merely set forth to illustrate embodiments of the present invention, but is not construed as limiting the scope defined by the claims even if there are restrictive expressions.

When the polarizing element of a polarizing film is conventionally bleached, the transparency of the polarizing element is insufficient, and the polarizing element may also revert to its original state after being allowed to stand for a short time at room temperature.

Intensive and thorough research into increasing the transparency of the polarizing film, carried out by the present inventors, resulted in the finding that, when the polarizing film is bleached using an inkjet printing process, the transparency of a specific pattern portion may be improved.

Furthermore, in order to increase the transparency of a specific pattern of a polarizing film, the present inventors have developed an ink composition suitable for use in an inkjet printing process. When the specific portion of the polarizing film is patterned by the ink composition of the invention and only the corresponding portion is bleached, transparency is drastically improved, which culminates in the present invention.

The present invention addresses an ink composition for bleaching a polarizing film for an inkjet printer, comprising a strong base, a volatilization inhibitor, a viscosity enhancer and a solvent, wherein the strong base is contained in an amount of 5 to 30 wt % based on the total weight of the composition.

In a preferred embodiment of the present invention, the polarizing film may be a PVA polarizing film.

In the present invention, the polarizing film typically functions to convert natural light into polarized light, and this function is realized by a dye material adsorbed to the polarizing plate. Generally, an LCD includes an iodine-type polarizing film containing a polarizing material, that is, an iodine dye adsorbed thereto. The iodine-type polarizing film is manufactured by dyeing a PVA-based film with dichroic iodine or a dichroic dye and aligning it in a predetermined direction using a uniaxial stretching process, and is mainly utilized in LCDs. For example, a polarizing film may be manufactured in a manner in which an unstretched PVA film is uniaxially stretched in an aqueous solution and then dipped into a solution containing iodine or potassium iodide, or an unstretched PVA film is dipped into a solution containing iodine or potassium iodide and then uniaxially stretched, or an unstretched PVA film is uniaxially stretched in a solution containing iodine or potassium iodide, or an unstretched PVA film is uniaxially stretched in a dry state and then dipped into a solution containing iodine or potassium iodide.

In the present invention, "bleaching" refers to a process in which a chemical reaction is caused in the polarizing element of a polarizing film so that the element is partially or entirely made optically transparent.

Below is a description of individual components of the ink composition for an inkjet printer according to the present invention.

The strong base is first described below.

In the composition of the present invention, the strong base makes the polarizing element of the polarizing film transparent, and functions to control the acidity of the ink composition. The ink composition of the present invention preferably has a pH of 13 to 14.

In a preferred embodiment of the present invention, the strong base comprises at least one selected from the group consisting of potassium hydroxide (KOH), sodium hydroxide (NaOH), calcium hydroxide (Ca(OH)$_2$) and barium hydroxide (Ba(OH)$_2$). Particularly useful is potassium hydroxide.

Based on the total weight of the ink composition, the strong base is contained in an amount of 5 to 30 wt %, and preferably 10 to 15 wt %.

If the amount of the strong base is less than 5 wt %, the bleaching rate may become poor due to low concentration. On the other hand, if the amount thereof exceeds 30 wt %, the head of the inkjet printer may be damaged.

Next, the volatilization inhibitor is described below.

In the present invention, the volatilization inhibitor functions to inhibit the clogging of a nozzle due to the volatilization of the ink composition.

In a preferred embodiment of the present invention, the volatilization inhibitor comprises at least one selected from the group consisting of 2-pyrrolidone, glycerin, 2-methyl-1,3-propanediol, and propylene glycol. Particularly useful is propylene glycol.

Based on the total weight of the ink composition, the volatilization inhibitor is contained in an amount of 1 to 50 wt %, and preferably 10 to 20 wt %.

If the amount thereof is less than 1 wt %, the ink may be volatilized, undesirably causing nozzle clogging. On the other hand, if the amount thereof exceeds 50 wt %, the bleaching rate may decrease. Hence, the amount of this component is preferably set to fall within the above range.

Next, the viscosity enhancer is described below.

In the present invention, the viscosity enhancer functions to aid the formation of ink drops to a predetermined size upon jetting at room temperature, for example, 25° C. The viscosity of the ink composition of the present invention is controlled to a jettable level, and is preferably set to 3 to 20 cP, and more preferably 4 to 15 cP.

In a preferred embodiment of the present invention, the viscosity enhancer comprises at least one selected from the group consisting of glycerin, polyvinylpyrrolidone, and 2-hydroxyethyl cellulose. Particularly useful is 2-hydroxyethyl cellulose.

Based on the total weight of the ink composition, the viscosity enhancer is contained in an amount of 0.1 to 5 wt %, and preferably 1 to 3 wt %.

If the amount of the viscosity enhancer is less than 0.1 wt %, the viscosity may decrease, making it difficult to form drops of the ink composition. On the other hand, if the amount thereof exceeds 5 wt %, the viscosity may increase and thus jetting may become difficult and the bleaching rate may be retarded.

Glycerin may be used as both the volatilization inhibitor and the viscosity enhancer. In the present invention, however, the volatilization inhibitor and the viscosity enhancer cannot both be glycerin.

Next, the solvent is described below.

The solvent of the present invention is used such that the total weight of the ink composition amounts to 100 wt %, and is added in the remaining amount other than the amounts of the above components of the composition.

Any solvent may be used so long as it is typically useful, but the solvent is preferably water. When the solvent is water, water for use in continuous processing, especially deionized and/or distilled water, having a resistivity of 18 MΩ·cm or more, is particularly useful.

In the ink composition for an inkjet printer according to a particular embodiment of the present invention, including potassium hydroxide serving as the strong base, the volatilization inhibitor, the viscosity enhancer and the solvent, a defoamer and a surfactant may be further included.

In a preferred embodiment of the present invention, the ink composition of the present invention may further include at least one selected from the group consisting of a defoamer and a surfactant.

Next, the defoamer is described below.

The ink composition of the present invention may foam when forming ink due to the addition of a surfactant. Even after the composition is fed into the head storage part of the printer, foam may be left behind, and nozzle clogging may occur upon jetting. Thus, the defoamer is further added to the ink composition, thereby suppressing the generation of foam.

In a preferred embodiment of the present invention, any defoamer may be used without limitation so long as it is typically useful. Preferably useful is at least one selected from the group consisting of Surfynol 104A, Surfynol 104BC, Surfynol 104DPM, Surfynol 104E, Surfynol 104H, Surfynol 104NP, Surfynol 104PA, Surfynol 104PG-50, and Surfynol 104S. Particularly useful is Surfynol 104E. The defoamer is used in an amount of 0.01 to 5 wt %, and preferably 0.1 to 1 wt %, based on the total weight of the ink composition.

If the amount of the defoamer is less than 0.01 wt %, the ink composition may generate foam, and thus the foam is not removed even after being fed into the inkjet head storage part, undesirably causing nozzle clogging. On the other hand, if the amount of the defoamer exceeds 5 wt %, surface tension may excessively decrease, undesirably causing nozzle wetting. Hence, the amount of the defoamer is preferably set to fall within the above range.

Next, the surfactant is described below.

In the present invention, the ink composition further includes the surfactant, whereby surface tension is decreased to thus facilitate ink jetting, so that the jetted composition may be appropriately spread on the substrate.

In a preferred embodiment of the present invention, any surfactant may be used so long as it is typically useful. Preferably useful is at least one selected from the group consisting of Surfynol 420, Surfynol 440, Surfynol 485, and Surfynol 485W. Surfynol 485 and/or Surfynol 485w may be particularly used. The surfactant is used in an amount of 0.1 to 5 wt %, and preferably 0.25 to 1 wt %, based on the total weight of the ink composition.

If the amount of the surfactant is less than 0.1 wt %, the surface tension of the ink may increase, so that jetting may become poor, and the jetted composition is not spread on the substrate and thus the pattern is not formed. On the other hand, if the amount of the surfactant exceeds 5 wt %, the surface tension of the ink may excessively decrease and thus the nozzle of the printer head may become wet and ink may excessively spread on the substrate even after jetting, making it difficult to form a pattern. Hence, the amount of the surfactant that is further included in the ink composition of the present invention is preferably set to fall within the above range.

The ink composition for an inkjet printer according to the present invention may further comprise at least one selected from the group consisting of a sequestering agent, a corrosion inhibitor, and a pH controller, in addition to the aforementioned components.

Consequently, the present invention provides an ink composition for an inkjet printer, and the transparency of a polarizing film may be improved using the same.

The ink composition according to the present invention contains the strong base in a preferred amount in order to ensure optical transparency suitable for a pattern that is required to impart high transparency to a polarizing film.

When the amount of the volatilization inhibitor of the present invention falls in the above range, the bleaching time may be controlled and nozzle clogging due to the volatilization of ink may be suppressed. Furthermore, when the amount of the viscosity enhancer falls in the above range, appropriate jetting performance may be obtained, and thus the composition of the invention may be suitably applied to the polarizing film.

In addition, the present invention addresses a method of manufacturing a polarizing film having a bleached pattern formed thereon, using the ink composition for an inkjet printer of the invention.

Specifically, the method of the invention includes the steps of (1) heating a polarizing film, (2) bleaching the heated polarizing film by discharging an ink composition through the inkjet head of an inkjet printer, and (3) neutralizing the bleached polarizing film, wherein the ink composition is discharged in an amount of 0.02 to 0.5 ml/cm$^2$ per unit area of the heated polarizing film in the step (2).

The step (1) of heating the polarizing film is described below.

In the present invention, bleaching is a chemical reaction and requires thermal energy during the reaction. Thus, heating the polarizing film has to be performed for the first time. As such, the heating temperature is 30 to 100° C., and preferably 40 to 70° C.

If the heating temperature is lower than 30° C., the rate of chemical reaction may decrease and thus the bleaching time may become long. On the other hand, if the heating temperature is higher than 100° C., the polarizing film may be deformed, and ink may excessively rapidly evaporate, making it difficult to form a pattern. Hence, the heating temperature is preferably set within the above range. Moreover, this heating process may be appropriately performed before a jetting process, at the same time as a jetting process, or after a jetting process.

The step (2) of bleaching the heated polarizing film by discharging the ink composition through the inkjet head of the inkjet printer is described below.

In this step, the ink composition is used as bleaching ink and is thus discharged or jetted through the inkjet head of the inkjet printer, so that the bleaching reaction may be carried out.

During the discharge of the composition, the dot pitch has to be controlled so as to optimize the amount of bleaching ink per unit area of the polarizing film. Thereby, a portion where bleaching does not occur due to non-dropping of dots inside a desired pattern is not provided, and also, deformation of the polarizing film and distortion of the pattern due to dropping of excessive dots may be prevented.

In the present invention, the amount of the ink composition that is discharged per unit area of the heated polarizing film is 0.02 to 0.5 ml/cm$^2$, and preferably 0.03 to 0.1 ml/cm$^2$. Given the above amount range, no empty space is generated when a line or surface pattern is formed, and processing efficiency may become good. The printing rate and the amount of ink that is applied may be appropriately adjusted depending on the processing rate. For example, in the case of a printer, the jetting frequency is adjusted to thus control the processing rate. Also, when the polarizing film is thick, a larger amount of ink may be applied.

The dot pitch of the ink composition is typically 5 to 508 μm, and preferably 20 to 200 μm. The dot pitch indicates the distance between the centers of dots adjacent to each other. Thus, in an embodiment of the present invention, when the dots of the ink composition have a size of about 140 μm in the inkjet printing process of the present invention, the distance between the centers of the dots adjacent to each other is set to 140 μm or less so that a line or surface may be formed. The dot pitch may be represented by the average of the Y-axis pitch and the X-axis pitch, in which the Y-axis is fixed and the X-axis value is adjusted depending on the discharge amount.

In a pattern printing process for forming a pattern, when ink is discharged downwards from an inkjet head, the inkjet head has to be spaced apart from the upper surface of the polarizing film by a predetermined interval. Here, the inkjet head may be moved leftwards, rightwards, forwards and backwards in the state of not being in contact with the polarizing film, or the polarizing film may be moved leftwards, rightwards, forwards and backwards below the inkjet head under the condition that the head is fixed.

Alternatively, the head may be mounted so as to discharge ink in a lateral direction, and the pattern may be formed while the relative positions between the head and the polarizing film are changed in upward, downward, leftward and rightward directions.

The inkjet head and the polarizing film are spaced apart from each other by an interval of 1 to 10,000 μm, and preferably 500 to 3,000 μm.

In a preferred embodiment of the present invention, the reaction temperature for forming the bleached pattern in this step may fall in the range of 30 to 100° C., and preferably 40 to 70° C. Also, the reaction time for forming the bleached pattern may fall in the range of 3 to 30 sec. The reaction time for forming the bleached pattern is determined as the period of time ranging from the moment at which ink is dropped on the polarizing film heated to 30 to 100° C. in the step (1) to the moment at which the polarizing film becomes transparent.

In this case, if the temperature is low or the time is short, bleaching does not completely occur. On the other hand, if the time is long, the processing time may be prolonged.

Next, the neutralization in the step (3) is described below.

The polarizing film bleached in the step (2) has to be neutralized with water or a weak acid solution because the ink composition is strongly alkaline, having a pH of 13 to 14. The temperature for neutralization may fall in the range of 25 to 70° C.

This neutralization process may be performed by dipping the bleaching ink-printed polarizing film into the neutralization solution or by coating the bleaching ink-printed polarizing film with the neutralization solution. In a preferred embodiment of the present invention, the neutralization solution may be water or a weak acid solution. The weak acid solution comprises at least one selected from the group consisting of boric acid, nitric acid and acetic acid, and has a pH of 5 to 6.

The coating of the bleaching ink-printed polarizing film with water or a weak acid solution may be performed using any one process selected from the group consisting of spraying, vapor coating, curtain coating, inkjet coating, screen printing, bar coating, slit-die coating, and dip coating, or other processes may be applied.

In a preferred embodiment of the present invention, the above method may further include (4) performing a drying process, after the neutralization in the step (3).

After the step (3), in order to remove water and impurities remaining on the polarizing film during the neutralization process, the drying process is conducted in an oven or by blowing air. Here, tension is preferably applied to the polarizing film so that the polarizing film is not wrinkled. The drying process is not particularly limited, but may be performed using an oven, IR light, dry air or hot air, which are typically useful in the art. Two or more drying processes may be sequentially or simultaneously carried out.

In addition, the present invention addresses a polarizing film having a bleached pattern formed thereon, manufactured through the above method, and also addresses a display including the polarizing film.

Consequently, in the present invention, the transparency of the polarizing film may be improved through the method of forming the bleached pattern on the polarizing film using the ink composition for an inkjet printer.

In order to ensure optical transparency suitable for a pattern that is required to impart high transparency to the polarizing film, the ink composition is discharged in an appropriate amount. The bleaching reaction is controlled under suitable temperature and time conditions, and the polarizing film having the bleached pattern may be appropriately manufactured by the use of the ink composition composed of suitable components.

MODE FOR INVENTION

A better understanding of the present invention may be obtained via the following examples, which are set forth to illustrate, but are not to be construed as limiting the scope of the present invention. The scope of the present invention is given by the claims, and also contains all modifications within the meaning and range equivalent to the claims. Unless otherwise mentioned, "%" and "part", indicating amounts in the following examples and comparative examples, are given on a weight basis.

1. Examples 1 to 8 and Comparative Examples 1 to 5

Ink compositions were prepared using components in the amounts shown in Table 1 below.

dropped on a polarizing film to the moment at which the polarizing film becomes transparent.

1) In accordance with a measurement method, regardless of ink jettability, a PVA polarizing film was heated to 60° C. One drop of the ink composition of each of Comparative Examples 1 to 5 was dropped on the heated film using a dropper, and the period of time required for the portion of the polarizing film on which the drop was formed to become transparent was measured.

2) In accordance with a measurement method using jettable ink, a PVA polarizing film was heated to 60° C. The ink composition of each of Examples 1 to 8 was discharged through an inkjet head so that a surface defined by a width and a length on the heated film was printed with ink drops. The period of time ranging from the moment immediately after the printing process to the moment at which the polarizing film became transparent was measured. The width and the length of the drops need not be the same as each other, and the printed surface has a width and length of 0.2 cm or more.

2) Measurement of Viscosity

Viscosity was measured at room temperature (25° C.) using a BROOKFIELD DV-III ULTRA device.

3) Phase Separation

Whether phase separation occurred was observed with the naked eye to evaluate storage stability.

4) Jetting

The initial printed state and the printed state after continuous jetting of each ink composition for 3 min or more were compared to thus evaluate jetting durability. The dot size and the dot pitch were observed using an optical microscope when the ink composition was jetted, and jetting performance was evaluated.

TABLE 1

| Wt % | KOH | Volatilization inhibitor | | Viscosity enhancer | | Surfactant | | Defoamer | | Secondary DW |
|---|---|---|---|---|---|---|---|---|---|---|
| Ex.1 | 10 | Propylene Glycol | 10 | 2-Hydroxyethyl cellulose | 1 | Surfynol 485 | 1 | Surfynol 104E | 0.1 | 77.9 |
| Ex.2 | 10 | Propylene Glycol | 20 | 2-Hydroxyethyl cellulose | 1 | Surfynol 485 | 1 | Surfynol 104E | 0.1 | 67.9 |
| Ex.3 | 10 | | 20 | | 1.5 | | 1 | | 0.1 | 67.4 |
| Ex.4 | 10 | | 20 | | 2 | | 1 | | 0.1 | 66.9 |
| Ex.5 | 10 | 2-Pyrrolidone | 10 | 2-Hydroxyethyl cellulose | 1 | Surfynol 485 | 1 | Surfynol 104E | 0.1 | 77.9 |
| Ex.6 | 10 | Glycerin | 10 | | 1 | | 1 | | 0.1 | 77.9 |
| Ex.7 | 10 | 2-Methyl-1,3-propanediol | 10 | | 1 | | 1 | | 0.1 | 77.9 |
| Ex.8 | 10 | Propylene Glycol | 20 | Polyvinyl pyrrolidone | 1 | | 1 | | 0.1 | 67.9 |
| C.Ex.1 | 10 | X | | X | X | X | | X | | 90 |
| C.Ex.2 | 10 | X | | Glycerin | 55 | X | | X | | 35 |
| C.Ex.3 | 10 | Propylene Glycol | 10 | PEG (Mn = 3400) (not dissolved) | 2 | X | | X | | 78 |
| C.Ex.4 | 2 | Propylene Glycol | 10 | 2-Hydroxyethyl cellulose | 1 | Surfynol 485 | 1 | Surfynol 104E | 0.1 | 85.9 |
| C.Ex.5 | 35 | Propylene Glycol | 10 | 2-Hydroxyethyl cellulose | 1 | Surfynol 485 | 1 | Surfynol 104E | 0.1 | 52.9 |

2. Test Examples 1 to 4

Examples 1 to 8 and Comparative Examples 1 to 5 were evaluated in the following Test Examples. The results are shown in Table 2 below.

1) Measurement of Bleaching Time

The bleaching time is determined as the period of time ranging from the moment at which the ink composition is

TABLE 2

| | Bleaching time (sec) | Viscosity | Phase separation | Jetting | Head damage |
|---|---|---|---|---|---|
| Ex. 1 | 13 | 4.01 | No | ○ | X |
| Ex. 2 | 13 | 6.8 | No | ○ | X |
| Ex. 3 | 13.5 | 7.7 | No | ○ | X |

TABLE 2-continued

| | Bleaching time (sec) | Viscosity | Phase separation | Jetting | Head damage |
|---|---|---|---|---|---|
| Ex. 4 | 14 | 10.3 | No | ○ | X |
| Ex. 5 | 15 | 4.73 | No | ○ | X |
| Ex. 6 | 19 | 7.41 | No | ○ | X |
| Ex. 7 | 15 | 5.40 | No | ○ | X |
| Ex. 8 | 14 | 2.80 | No | Δ | X |
| C. Ex. 1 | 10 | 1.03 | No | X | X |
| C. Ex. 2 | — | 13.3 | No | — | X |
| C. Ex. 3 | — | — | Not dissolved polymer | — | X |
| C. Ex. 4 | 30 | 3.8 | No | ○ | X |
| C. Ex. 5 | 13 | 6.2 | No | ○ | ○ |

As is apparent from Table 2, Examples 1 to 8 were superior to Comparative Examples 1 to 5.

In order to enable bleaching within 20 sec in the Examples and Comparative Examples, each ink composition was prepared using 10 wt % of KOH having a pH of 13 to 14.

To maintain the viscosity of 4 to 15 cP at room temperature (25° C.), ink was manufactured using, as the viscosity enhancer, polyvinylpyrrolidone, glycerin, and 2-hydroxyethyl cellulose.

In Examples 1 to 4, propylene glycol was used as the volatilization inhibitor, and 10 wt % thereof was contained in Example 1, whereby the bleaching time was 13 sec, which is superior. In Examples 2 to 4, to maximally suppress volatilization, 20 wt % of the volatilization inhibitor was contained, whereby the bleaching time was 13 sec and nozzle clogging due to volatilization was further reduced, thus exhibiting superior jetting stability.

Based on the results of evaluation of jetting durability in Examples 1 to 4 including propylene glycol, excellent jetting stability resulted.

In Example 5, the volatilization inhibitor, the viscosity enhancer and the surfactant were contained, 10 wt % of 2-pyrrolidone was used as the volatilization inhibitor, and the bleaching time was delayed by 15 sec or more compared to Comparative Example 1. In Example 6, in which glycerin was used as the volatilization inhibitor in the same wt % as in Example 5, in lieu of 2-pyrrolidone, the viscosity was good, to the level of 7.41 cP (25° C.).

In Example 7, 2-methyl-1,3-propanediol was used as the volatilization inhibitor, thus exhibiting no phase separation and enabling jetting.

In Comparative Example 1, the bleaching time was as short as 10 sec, but the viscosity was as low as 1.03 cP at room temperature (25° C.) and surface tension was high, making it difficult to perform a jetting process. Furthermore, ink was easily evaporated to thus clog the nozzle and was jetted in non-uniform dots, and was thus unsuitable for use in inkjet processing.

In Comparative Example 2, using glycerin as the viscosity enhancer, the extent of increase in viscosity was low and thus poor jetting stability resulted. Also, 2-hydroxyethyl cellulose was found to exhibit the best bleaching rate relative to the extent to which viscosity was increased.

In Comparative Example 4, containing a small amount of a strong base, the bleaching time was 30 sec or more, and thus the bleaching rate was remarkably decreased. In Comparative Example 5, containing an excessive amount of a strong base, the head of the inkjet printer was damaged. Hence, the optimal bleaching rate was maintained within the content range of the strong base of the present invention.

1. Examples 9 to 18 and Comparative Examples 6 and 7

Preparation Example 100 wt % of an ink composition was prepared by mixing 10 wt % of calcium hydroxide, 20 wt % of propylene glycol, 1 wt % of 2-hydroxyethyl cellulose, 1 wt % of a surfactant (Surfynol485), 0.1 wt % of a defoamer (Surfynol104E) and 67.9 wt % of secondary distilled water.

Examples 9 to 14

Individual PVA polarizing films were heated to the temperatures shown in Table 3 below. One drop of the ink composition prepared in the Preparation Example was dropped on each of the heated PVA polarizing films using a dropper. The period of time ranging from the moment at which the ink composition was dropped to the moment at which the portion of the polarizing film where the drop was formed became transparent was measured. The results are shown in Table 3 below. Here, the width and the length of the formed dot need not be the same as each other, and the printed surface has a width and length of 0.2 cm or more.

TABLE 3

| | Ex.9 | Ex.10 | Ex.11 | Ex.12 | Ex.13 | Ex.14 |
|---|---|---|---|---|---|---|
| Substrate heating temperature (° C.) | 40 | 50 | 60 | 25 | 30 | 35 |
| Bleaching time (sec) | 14 | 12.5 | 12.5 | 50 | 27 | 25 |

Examples 15 to 18 and Comparative Examples 6 and 7

Individual PVA polarizing films were heated to 60° C. The ink composition obtained in the Preparation Example, serving as bleaching ink, was discharged on each of the heated PVA polarizing films in the amounts shown in Table 4 below upon inkjet printing. The amount of ink that was discharged per unit area was determined by multiplying the volume of a single drop by the number of dots. In order to apply ink at an accurate position, the inkjet head was spaced apart from the polarizing film by an interval of 1,000 μm, and the dot pitch of the ink composition was an average of 40 μm.

Test Example

After the printing process, the bleached pattern state due to the presence or absence of empty space, ink overflow, and ink shortage was observed using an optical microscope, on the basis of which jetting performance was evaluated. The results are shown in Table 2 below.

Bleaching

O: complete transparency of patterned area

Δ: some transparency of patterned area

X: opaque patterned area

Pattern Sharpness

O: sharpness at boundary of bleached pattern

Δ: some sharpness at boundary of bleached pattern

X: non-sharpness at boundary of bleached pattern

TABLE 4

| | Ex.15 | Ex.16 | Ex.17 | Ex.18 | C.Ex.6 | C.Ex.7 |
|---|---|---|---|---|---|---|
| Discharged amount per unit area (ml/cm$^2$) | 0.032 | 0.088 | 0.021 | 0.016 | 0.01 | 0.6 |
| Bleaching | ○ | ○ | Δ | Δ | X | ○ |
| Pattern sharpness | ○ | ○ | Δ | Δ | X | X |

As is apparent from Table 4, in Comparative Example 6, when the amount of ink that was discharged per unit area (cm$^2$) was less than 0.02 ml, bleaching did not occur due to the thickness of the polarizing film. In Comparative Example 7, when the discharged amount thereof exceeded 0.5 ml, a desired pattern could not be obtained due to the overflow of excess ink.

In Examples 15 and 16, when the discharged amounts per unit area were 0.032 ml and 0.088 ml, respectively, bleaching occurred, and superior pattern sharpness resulted. Therefore, the ink composition of the present invention can be concluded to be suitable for use in an inkjet printer in order to improve the pattern transparency of the polarizing film.

The invention claimed is:

1. An ink composition for bleaching a polarizing film for an inkjet printer, comprising: a strong base, a volatilization inhibitor, a viscosity enhancer and a solvent, wherein the strong base is contained in an amount of 5 to 30 wt % based on a total weight of the composition, and wherein the viscosity enhancer comprises 2-hydroxyethyl cellulose.

2. The ink composition of claim 1, wherein the strong base comprises at least one selected from the group consisting of potassium hydroxide (KOH), sodium hydroxide (NaOH), calcium hydroxide (Ca(OH)$_2$), and barium hydroxide (Ba(OH)$_2$).

3. The ink composition of claim 1, wherein the volatilization inhibitor comprises at least one selected from the group consisting of 2-pyrrolidone, glycerin, 2-methyl-1,3-propanediol, and propylene glycol.

4. The ink composition of claim 1, further comprising at least one selected from the group consisting of a defoamer and a surfactant.

5. The ink composition of claim 4, wherein the defoamer is used in an amount of 0.01 to 5 wt % based on the total weight of the composition.

6. The ink composition of claim 4, wherein the surfactant is used in an amount of 0.1 to 5 wt % based on the total weight of the composition.

7. The ink composition of claim 1, which is used for a polyvinyl alcohol (PVA) polarizing film.

* * * * *